United States Patent [19]

Morano et al.

[11] 4,189,260
[45] Feb. 19, 1980

[54] DISPATCH AND RECEIVE TERMINAL FOR A PNEUMATIC CARRIER SYSTEM

[75] Inventors: Robert E. Morano, Ringwood; Adam Weissmuller, Pompton Plains; Victor J. Vogel, Oakridge, all of N.J.

[73] Assignee: The Mosler Safe Company, Hamilton, Ohio

[21] Appl. No.: 916,566

[22] Filed: Jun. 19, 1978

[51] Int. Cl.[2] .............................................. B65G 51/26
[52] U.S. Cl. ..................................... 406/76; 406/112
[58] Field of Search ...................... 243/19, 25, 26, 27, 243/28; 406/76, 112

[56] References Cited

U.S. PATENT DOCUMENTS

| | | | |
|---|---|---|---|
| 3,985,316 | 10/1976 | Weissmuller | 243/19 |
| 4,084,770 | 4/1978 | Warmann | 243/25 |

*Primary Examiner*—Jeffrey V. Nase
*Attorney, Agent, or Firm*—Wood, Herron & Evans

[57] ABSTRACT

A dispatch and receive terminal that, in preferred form, includes an air tight pusher housing and a pusher flap swingably mounted to move between a retract position and an extend position in response to air pressure in that housing. In the dispatch or pressure mode, the pusher flap swings into an air tight terminal housing to push the carrier axially along the guide tray and partially back into the system tube. After the carrier has been initially dispatched back into the system tube, and as the pusher flap swings further into the terminal housing to an open position, the pusher flap structure opens a pressure port between the terminal and the pusher housings, thereby pressurizing the terminal housing and the system tube behind the carrier for pushing the carrier completely out of the housing and at least partially through the tube. The pusher assembly also includes a check valve flap structurally connected with the pusher flap, the check valve flap remaining closed in response to pressure, but opening in response to vacuum, in the pusher housing. In the receive or vacuum mode, the check valve flap opens a vacuum port between the terminal and pusher housings, thereby creating a vacuum in the terminal housing and in the system tube ahead of the carrier to aid in drawing or returning the carrier into that housing from the system tube.

26 Claims, 7 Drawing Figures

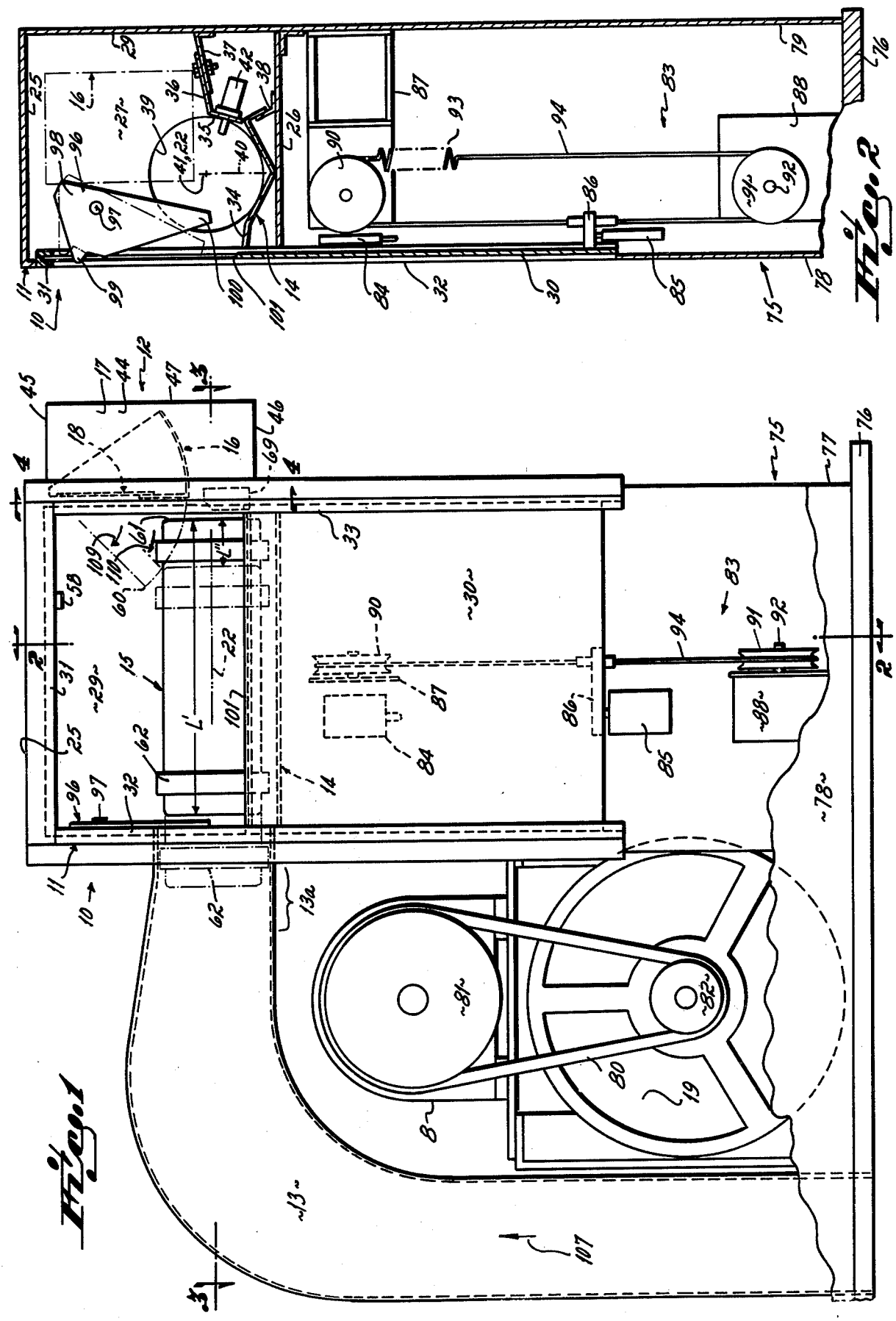

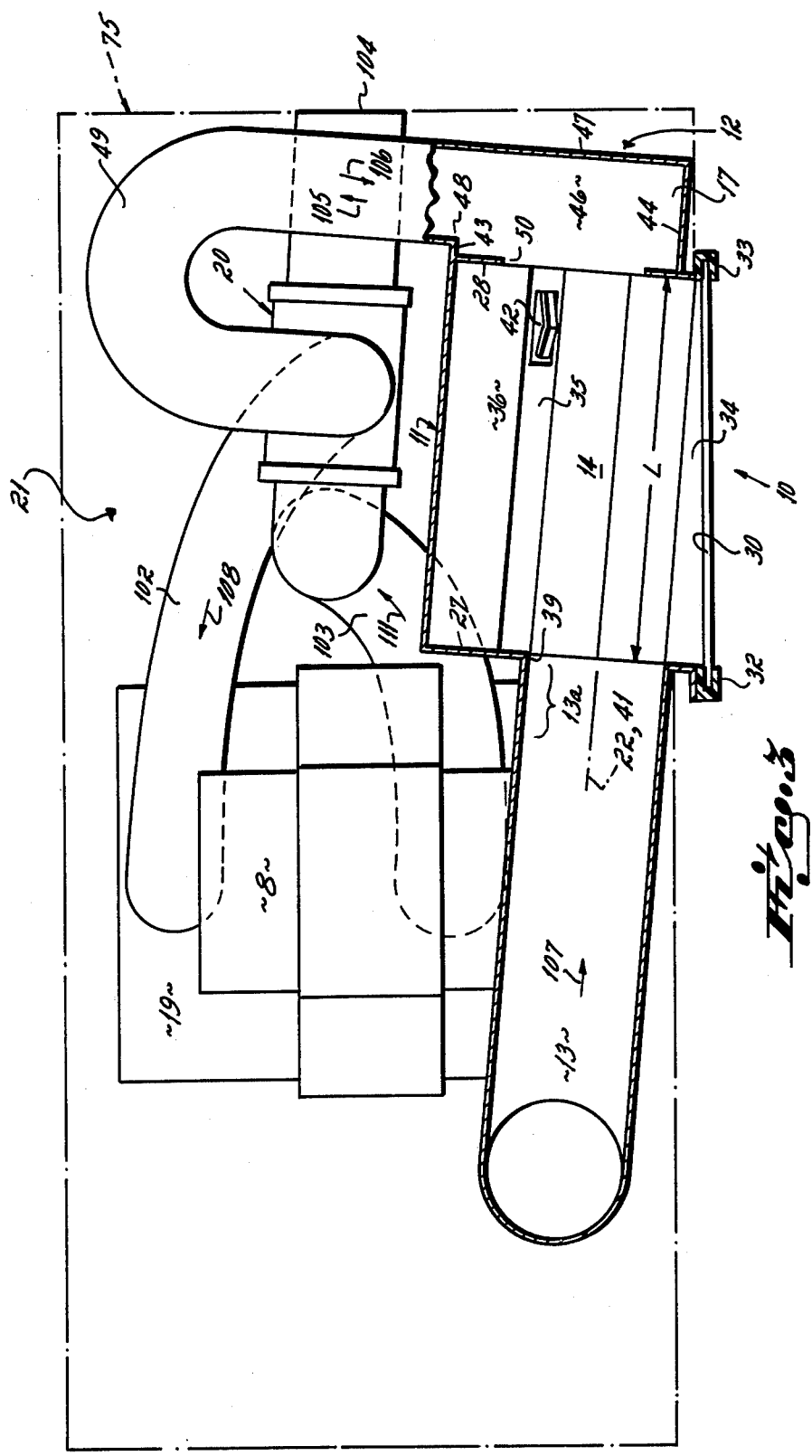

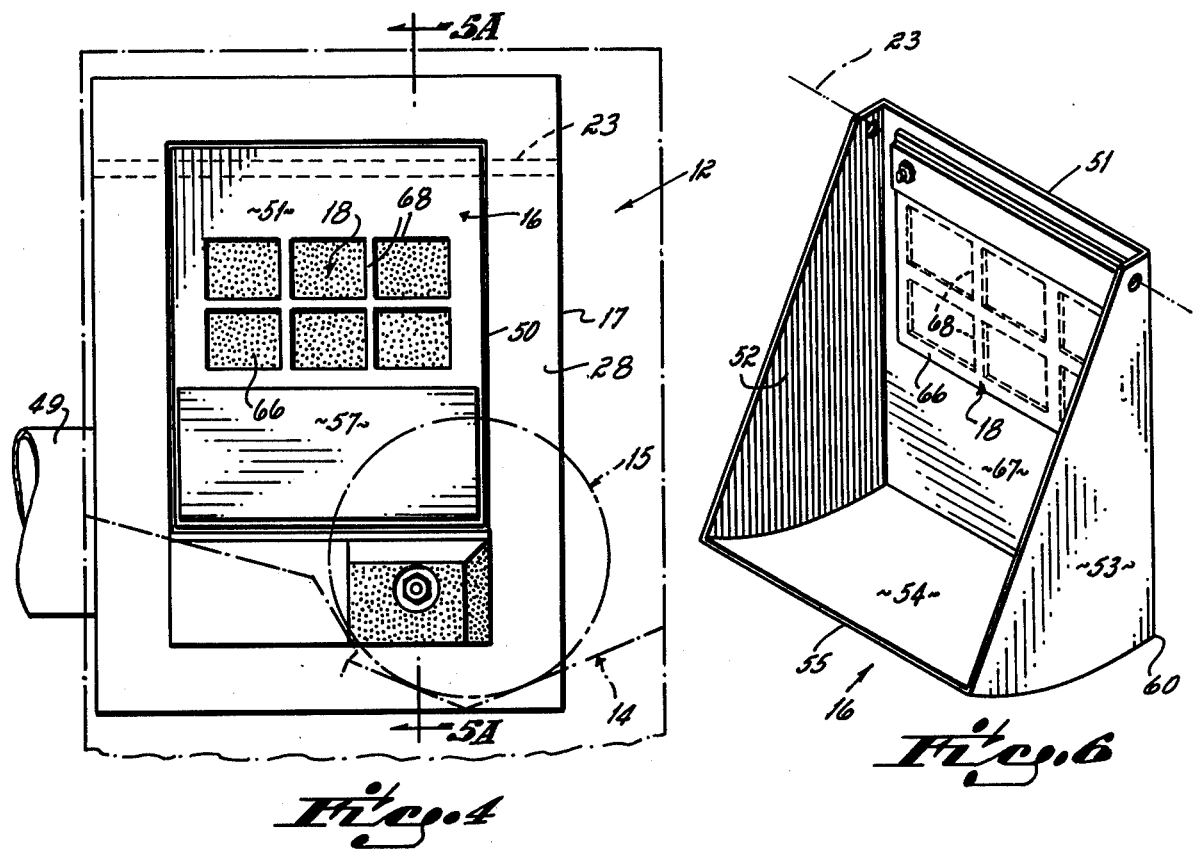
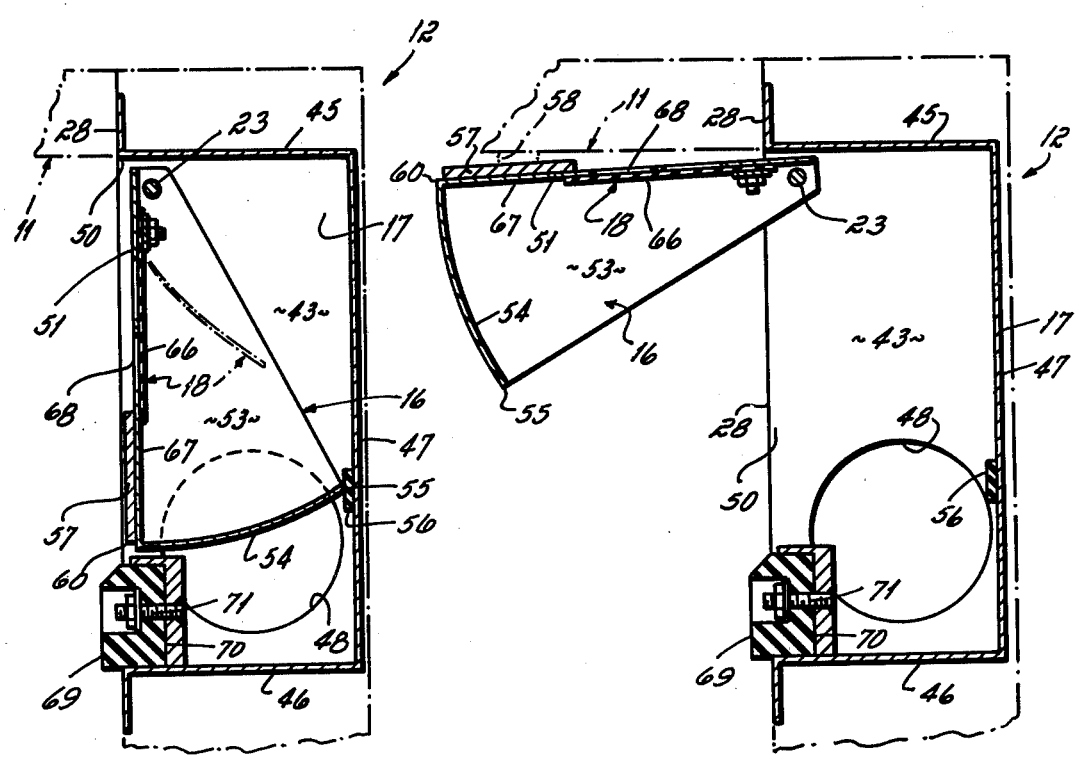

DISPATCH AND RECEIVE TERMINAL FOR A PNEUMATIC CARRIER SYSTEM

This invention relates to pneumatic carrier systems. More particularly, this invention relates to a dispatch and receive terminal for a pneumatic carrier system.

Pneumatic carrier systems are commonly used for transmitting documents and the like in a carrier through a tube from one location to another. Such prior art systems are frequently found within hospitals, department stores, and the like, and are most commonly employed to move carriers through a system of tubes between a single central terminal, and a plurality of remote terminals located throughout the facility. One specific industry in which pneumatic carrier systems have received significant commercial interest in recent years is the banking industry. As drive-in banks have become an accepted approach to banking, the pneumatic carrier system has become an accepted approach for dispatching and receiving carriers, with money or checks or deposit slips or withdrawal slips, or the like therein, between the central teller terminal located within a branch bank office's interior, and a plurality of customer terminals located on separate drive-in type islands remote from the teller terminal. In this type of environment, of course, the customer terminal is manned or operated by a lay-person not normally proficient in the mechanical operation of a dispatch and receive terminal for a pneumatic carrier system. One of the problems that arises from a practical standpoint, therefore, is that of reintroducing the carrier into the system tube when it is desired to transmit or dispatch the carrier from the remote terminal to the central terminal, i.e., from the customer location to the teller location. In this regard, it is necessary that the carrier be positively advanced from the terminal housing at least partially into the system tube so as to insure motion of the carrier through the tube between the remote and central terminals since such movement is dependent on achieving and maintaining an air pressure differential between the leading end of the carrier and the trailing end of the carrier.

It has been one objective of this invention, therefore, to provide a dispatch and receive terminal for a pneumatic carrier system that includes a novel pusher assembly which is operable to apply a direct axial force to a carrier at rest within the terminal housing for initially and automatically kicking or pushing the carrier from its rest position in the terminal housing into a system tube when the terminal is established in the dispatch mode.

It has been another objective of this invention to provide an improved dispatch and receive terminal for a pneumatic carrier system in which, when the terminal is in the dispatch mode, a source of system air pressure cooperates with a pusher assembly to initially kick or push a carrier into a system tube from a rest position in the terminal housing, and thereafter at least partially pressurizes the system tube behind the carrier in that tube to aid in pushing the carrier through the tube to another terminal, and which, when the terminal is in the receive mode, exposes a vacuum source through the pusher assembly to the system tube in front of the carrier in that tube to aid in drawing the carrier back into a rest position in the terminal housing.

It has been a further objective of this invention to provide a dispatch and receive terminal for a pneumatic carrier system in which a carrier may be located in a rest position within a terminal housing, a swingable pusher being movable to provide a generally axial dispatch force on one end thereof for initially kicking the other end of the carrier into the system tube, the pusher being movable between retracted and extended positions within an air tight pusher housing in response to a pneumatic pressure source selectively connectable to that pusher housing when the terminal is in the dispatch mode.

It has been still another objective of this invention to provide an improved dispatch and receive terminal for a pneumatic carrier system of the type described in the paragraph immediately above in which the pusher, after kicking the carrier into the system tube, and in response to the pressure source, is movable further into an open position at which a pressure port is opened between the pusher and terminal housing, thereby exposing the terminal housing and the system tube behind the carrier so that same pressure source to aid in forwarding the carrier to another terminal.

It has been still a further objective of this invention to provide an improved dispatch and receive terminal for a pneumatic carrier system of the type described in the two paragraphs immediately above in which the pusher itself is provided with a check valve that remains closed to permit the pusher to move from the retracted to the extended and then to the open positions in response to the pressure mode, but which opens a vacuum port to expose the terminal housing and the system tube in front of the carrier to a vacuum in response to a vacuum source selectively connectable to that pusher housing, thereby aiding the return of the carrier to the terminal when the terminal is in the receive mode.

In accord with these objectives, an improved dispatch and receive terminal in accord with the principles of this invention includes a guide tray for supporting a carrier in an air tight terminal housing, the terminal housing including a door to provide manual access to the carrier inside. The terminal housing is connected with a system tube at one end of the guide tray, and is connected with a novel pneumatic pusher assembly at the other end of the guide tray. In preferred form, the pusher assembly includes an air tight pusher housing and a pusher flap swingably mounted to move between a retract position and an extend position in response to air pressure in that housing. In the dispatch or pressure mode, the pusher flap swings into the air tight terminal housing to push the carrier axially along the guide tray and partially back into the system tube. After the carrier has been initially dispatched back into the system tube, and as the pusher flap swings further into the terminal housing to an open position, the pusher flap structure opens a pressure port between the terminal and the pusher housings, thereby pressurizing the terminal housing and the system tube behind the carrier for pushing the carrier completely out of the housing and at least partially through the tube toward another terminal. The pusher assembly also includes a check valve flap structurally connected with the pusher flap, the check valve flap remaining closed in response to pressure, but opening in response to vacuum, in the pusher housing. In the receive or vacuum mode, the check valve flap opens a vacuum port between the terminal and pusher housings, thereby creating a vacuum in the terminal housing and in the system tube ahead of the carrier to aid in drawing or returning the carrier back into that housing from the system tube. This terminal structure can be connected with a single pressure and vacuum source, the pressure or vacuum being selectively applied to the pusher housing, and through the pusher housing also to the terminal housing and system tube, depending on whether the terminal is in the dispatch or receive mode.

Other objectives and advantages of this invention will be more apparent from the following detailed description taken in conjunction with the drawings in which:

FIG. 1 is a side elevational view of a dispatch and receive terminal in accord with the principles of this invention, the terminal housing door being open to permit manual access to a carrier shown at rest within that housing;

FIG. 2 is an end cross sectional view taken along line 2—2 of FIG. 1;

FIG. 3 is a top cross sectional view taken along line 3—3 of FIG. 1;

FIG. 4 is an end cross sectional view taken along line 4—4 of FIG. 1;

FIG. 5A is a side cross sectional view taken along line 5A—5A of FIG. 4, and showing the pusher flap in the fully closed or retracted position;

FIG. 5B is a view similar to FIG. 5A, but illustrating the pusher flap in the fully opened or extended position; and FIG. 6 is a perspective view of the pusher flap that cooperates with the pusher housing.

The dispatch and receive terminal 10 of this invention basically includes a terminal housing 11, and a pusher assembly 12, see FIGS. 1 and 2. The terminal housing 11 is connected at one end with a system tube 13, and the pusher assembly 12 is connected at that end of the housing opposite the system tube. The terminal housing 11 also includes a guide tray 14 or support on which a carrier 15 is received, and from which the carrier is dispatched, the carrier being supported on that tray in substantially horizontal position relative to ground. The pusher assembly 12 includes a pusher 16 in the form of a swinging scoop shaped flap, see FIG. 6, in pusher housing 17. The pusher 16 is adapted to move between retracted and extended positions for initially kicking or pushing the carrier 15 from the terminal housing 11 into the system tube 13 in response to pneumatic pressure in the pusher housing 17 when the terminal 10 is in the dispatch mode as discussed in detail below. The pusher 16 itself also includes a check valve flap 18 that opens in response to a vacuum in the pusher housing 17 when the terminal 10 is in the receive mode, also as discussed in detail below. A pressure source, and a vacuum source, are both connected with the pusher housing 17; the same motor 8 and fan 19 can be used to create both pressure or vacuum in pusher housing 17 as controlled by four-way valve 20 in the pneumatic circuit 21 connecting the fan and the pusher housing.

The terminal housing 11 includes a ceiling wall 25, a floor wall 26, opposed end walls 27, 28, a rear wall 29, and a face wall in the form of door 30, see FIGS. 1-3. The door 30 cooperates with tracks 31-33 fixed to the ceiling 25 and end 27, 28 walls, the side edge tracks 32, 33 extending substantially below the floor 26 of the terminal housing 11. The door 30 is movable between an open position shown in FIG. 1, and a closed position (not shown), selectively, for opening the housing's interior to permit removal and replacement of a carrier 15 therein by the terminal's user, and for substantially sealing the housing's interior into an air tight or primary plenum chamber. The tracks 31-33 are suitably structured to provide an air tight seal with the door 30 when it is in the upper or closed position (not shown). The system tube 13 is connected with end wall 27 of the terminal housing 11, and extends from terminal 10 to another terminal (not shown) remote therefrom for transmitting the carrier 15 between those two terminals. System tube port 39 connects the terminal housing 11 and the system tube 13.

The floor 26 of the terminal housing 11 carries the horizontal guide tray 14 to receive and support the carrier 15 in a rest position within that housing, see FIGS. 2 and 3. This tray or support 14 is generally V-shaped in cross section, and is provided with upwardly flaring flanges 34-36 from each side thereof. Brackets 37, 38 mount the guide tray 14 in fixed position within the terminal housing 11, see FIG. 2. The V-shaped guide tray 14 and upwardly flaring flanges 34-36 cooperate to insure that a carrier 15 will roll into axial alignment with the V-shaped tray as long as the carrier is initially located generally parallel with the V-shaped tray when placed in the housing by the terminal user. This guide tray 14 structure is important in that it is necessary to insure alignment of the carrier's axis 22 with system tube access port 39 defined in the housing's end wall 27 and, thereby, with the system tube section 13a adjacent that access port, when the carrier is placed back into the housing by the terminal user and prior to use of the terminal in the dispatch mode. Note particularly, therefore, and as shown by FIGS. 1-3, that the vertical center plane 40 of the horizontal carrier support tray 14 includes the axial center line 41 of the system tube port 39 in the terminal housing 11, and that the port axis 41 is coaxial with carrier axis 22 when a carrier 15 is in position on the guide tray. A carrier sensor switch 42 is mounted to the carrier tray 14 along one side thereof, as shown in FIGS. 2 and 3. The carrier sensor switch 42 is positioned at that end of the terminal housing 11 remote from the system tube port 39 for sensing receipt of the carrier 15 in the terminal housing.

The pusher assembly 12 includes pusher housing 17 which defines a secondary plenum chamber, the secondary plenum chamber being air tight under certain operational conditions, see FIGS. 1, 3 and 5A. The pusher housing 17 is connected to the terminal housing 11 on that end wall 28 opposite to the system tube port wall 27 of the terminal housing, and itself includes end wall 28 as a common end wall with the terminal housing. The pusher housing 17 also includes rear 43 and front 44 walls, top 45 and bottom 46 walls and end wall 47. Access port 48 in the pusher housing's rear wall 43 cooperates with connector tube 49 of the pneumatic circuit 21 to connect the pusher housing 17 with the air pressure and vacuum source 8, 19. Pressure port 50 is defined in common end wall 28 to connect the pusher housing 17 and the terminal housing 11 interiors under certain operational conditions described in detail below, and pusher flap 16 is swingable through that pressure port. The pusher housing 17 also mounts a carrier bumper 69 fixed in seat 70 by bolt 71 as shown in FIGS. 4 and 5. The bumper 69 is located to cooperate with the carrier 15 upon receipt of the carrier on the guide tray 14.

The pusher assembly 12 includes, as one of its primary elements, a pusher flap 16 of a generally cup or scoop shaped configuration. The pusher flap is swingably or pivotally mounted to the pusher housing 17 on an axis 23 elevated above a carrier 15 at rest in the terminal housing and transverse to that carrier axis 22, and is mounted to cooperate with pressure port 50 in the terminal's common end wall 28. The pusher flap 16 is particularly configured, as illustrated in FIGS. 5 and 6, to include a pusher wall 51, side walls 52, 53 and a base wall 54 in a cup or scoop type geometry as mentioned. The pressure port 50 is sized and configured to establish a generally sealing relation with the pusher flap 16 when the pusher flap is fully retracted, thereby establishing the pusher housing in a generally air tight attitude when that flap is retracted, see FIGS. 4 and 5. The pusher flap's base wall 54 is of a length that positions the pusher wall 51 vertically within pressure port 50 when the pusher flap 16 is fully retracted as shown in FIG. 5A, the flap's rear edge 55 in that attitude abutting bumper strip 56 on the inside face of the pusher housing's end wall 47. Counterweight 57 is fixed across the bottom edge of the pusher wall 51, and functions to normally bias the pusher flap 16 into the storage or retracted attitude illustrated in FIG. 5A when the pusher housing 17 is not pressurized, i.e., when fan 19 is not operating. The pusher flap 16 is swingable from the fully retracted or closed position, shown in FIG. 5A, to a fully extended or open position, shown in FIG. 5B, in response to positive pneumatic pressure introduced into the pusher housing 17 from the air pressure source 8, 19 through connector tube 49. Bumper 58 is mounted to the ceiling 25 of the terminal housing 11 so that the pusher flap 16 can bump and stop thereagainst to establish the fully extended or open position. Particularly note that in the open position of pusher flap 16 as shown in FIG. 5B, the pressure port 50 between pusher housing 17 and terminal housing 11 is wide open, i.e., the interiors of those two housings are not sealed one from the other. On the other hand, in the fully retracted position of pusher flap 16 as shown in FIG. 5A, the pressure port 50 between pusher housing 17 and terminal housing 11 is generally sealed because the pusher flap blocks that port.

As shown particularly in FIG. 1, the inside length L of the terminal housing 11 is only slightly greater than the length L' of a carrier 15. And the pusher flap 16 is positioned in end wall 28 so that its leading edge 60 will contact the carrier's end wall 61 when the carrier 15 is wholly within the terminal housing 11. The pusher flap 16 is sized, and the pusher flap's pivot axis 23 is located, so as to insure that pushing contact of the pusher flap will be maintained on the carrier's end wall 61 as the pusher flap is swung from the fully retracted position to an intermediate position (shown in phantom lines in FIG. 1), thereby initially pushing or kicking the carrier 15 well into the system tube 13 (compare the carrier's solid line position to its phantom line position as shown in FIG. 1) when the pusher housing 17 is pressurized, i.e., when the terminal 10 is in the dispatch mode. The effective pushing length L" of the pusher flap 16 on carrier 15 is established because the side walls 52, 53 and base wall 54 of the pusher flap allow a moving relatively air tight seal to be maintained between the interior of the pusher housing 17 and the interior of the terminal housing 11 as the pusher flap swings from the retracted to the intermediate position. When the pusher flap 16 reaches the intermediate position, it is released from contact with the carrier's end wall 61 to swing further upwardly into the fully extended or open position. At the fully extended or open position, pressure port 50 in the common wall 28 is opened to provide the same positive pressure in the terminal housing 11 as in the pusher housing 17. Once the carrier 15 is partially within the system tube 13, and because of the relative sealing contact between the carrier's lead sealing rings 62 and the system tube's inside surface, pressure in the terminal housing functions to push the carrier 15 fully into the system tube 13, and continues to act on the carrier's end wall 61 when in that tube 13 to aid in transmitting the carrier 15 from terminal 10 to another terminal (not shown) remote therefrom.

The pusher flap 16 also includes a check valve 18 in structural combination therewith, see FIGS. 4 and 5A. The check valve 18 is in the nature of a pivotable flap 66 connected to the rear face 67 of the pusher flap's pusher wall 51, that flap being of a flexible material. The check valve flap 66 covers a series of vacuum windows or ports 68 defined in the pusher wall 51. When the pusher assembly 12 is in the dispatch or pressure mode, the check valve flap 66 prevents substantial leakage of pressurized air from the pusher housing 17 into the terminal housing 11 through those vacuum ports 68 because it is pressed against the inside face of the pusher wall 51 as illustrated in solid lines in FIG. 5A. However, and when the terminal 10 is in the vacuum or receive mode, i.e., when the pusher housing 17 is under vacuum, the check valve flap 66 is swingable into the phantom line attitude illustrated in FIG. 5A so as to open the terminal housing 11 interior to that vacuum, too. In this vacuum mode, the pusher flap 16 is retained in the FIG. 5A fully retracted attitude because it's rear edge 55 abuts the horizontal bumper strip 56 on the back wall 47 of the pusher housing 17 as shown in FIG. 5A. Hence, the terminal housing 11 interior, as well as the system tube 13, is exposed to vacuum from the vacuum source 8, 19 as introduced through the pusher housing 17 and through the pusher flap's vacuum port 68.

The terminal housing 11 is mounted inside an enclosed stand 75 which includes base 76, and side 77, front 78, and rear 79 walls, see FIGS. 1 and 2. Motor 8 and fan 19 are mounted on the stand's base plate 76. The fan 19 is driven by belt 80 that connects motor pulley 81 and fan pulley 82, the motor 8 being mounted on top the fan 19 housing as shown in FIGS. 1 and 3. The terminal's stand 75 also carries the downwardly extending tracks 32, 33 for door 30. The raise and lower mechanism 83 for the door 30 is shown in FIGS. 1 and 2, and is mounted within the stand housing 76–79 beneath the terminal housing 11. The door's raise and lower mechanism 83 includes an upper limit switch 84 and a lower limit switch 85 adapted to be activated by inwardly extending nose 86 fixed to the bottom edge of the door 30. The door's raise and lower mechanism 83 is partially supported on brace 87 fixed inside to the stand framework 76–79, and includes motor drive 88 mounted on the base plate 76. An idler pulley 90 is rotatably secured to the upper brace 87, and a drive pulley 91 is fixed to the motor drive shaft 92. A spring 93 loaded tension member 94 is connected at both ends to the door's nose 86, and is oriented around the drive 91 and idler 90 pulleys in drive belt fashion.

A gravity latch 96 is provided to cooperate with access port 39 of the terminal housing 11 for the carrier 15, see FIG. 2. The gravity latch 96 is movable between an access port 39 blocking position shown in solid lines in FIG. 2, and an access port open position shown in phantom lines in FIG. 2. The function of the gravity latch 39 is to prevent a carrier's ingress to or engress from the system tube 13 when the terminal housing's door 30 is opened or lowered as shown in FIG. 1.

Toward this end, the latch 96 itself is of a dog ear or triangular configuration, the latch being pivotally mounted to access port end wall 27 on axis 97 at one corner 98. The latch 96 includes cam nose 99 at another corner that is positioned to cooperate with the door 30. In the door open position shown in FIG. 2, the latch 96 simply pivots by gravity about axis 97 until corner 100 partially blocks the system tube access port 39 in the terminal housing 11. In the door 30 closed position, and as the door is upraised from the fully opened position shown in FIGS. 1 and 2 to the fully closed position, the top edge 101 of the door cooperates with the latch's cam nose 99 to cam the latch 96 closed into the phantom line position once the door 30 is fully closed. In this context, therefore, the latch 96, since it is gravity operated, is fail safe to prevent transmission or reception of a carrier 15 from or into the terminal housing 11 when the door 30 is opened.

The terminal's pressure source and the vacuum source are both connected by pipe 49 to rear wall 43 of the pusher housing 17 at access port 48, see FIG. 3. The connector pipe 49, which is part of the pneumatic circuit 21, is connected with a four-way valve 20 that is operable by an electro-mechanical actuator (not shown). The electro-mechanical actuator functions to change the four-way valve as required to change the pusher housing 17 between the pressure mode and the vacuum mode as established by motor 8 and fan 19. Toward this end, the four-way valve 20 is provided with a first hose 102 connected to the high pressure side of the fan 19, and a second hose 103 connected to the low pressure side of fan 19, both hose being connected with the four-way valve. The fourth side of the four-way valve 20 is connected to atmosphere as at portion 104. Air from the pusher 17 and terminal 11 housings can be exhausted when the four-way valve 20 is translated into the vacuum mode to establish air flow in connector hose 49 as illustrated by phantom arrow 105, and high pressure air can be introduced into the pusher 17 and terminal housing 11 when the four-way valve 20 is in the pressure mode to establish air flow in conector hose 49 as illustrated by phantom arrow 106.

In use of the terminal 10, and when the terminal is in the receive or vacuum mode, i.e., when a carrier 15 is traveling along path 107 in the system tube 13 toward the terminal, the pusher housing's interior is under vacuum as established by fourway valve 20 and air flow 105, 108, 111 in the pneumatic circuit 21. Further, and because the pusher assembly's check valve flap 66 is in the phantom line attitude shown in FIG. 5A when the pusher housing 17 is under vacuum, the terminal housing's interior will be under vacuum as well because it will be exposed to that vacuum through open vacuum ports 68 in the pusher flap's pusher wall 51. Further, the vacuum also will be introduced into the system tube 13 itself ahead of a returning carrier 15 therein through carrier access port 39 to the terminal housing's interior. In this manner, therefore, a vacuum generated by vacuum source 8, 19 is created in terminal housing 11 and system tube 13, thereby aiding the return of carrier 15 into the terminal housing and onto guide tray 14. As the carrier 15 is received into the terminal housing 11, it bumps against bumper 69 and is thereby located within that housing as shown in solid lines in FIG. 1. Contact of carrier 15 with sensor switch 42 when it is received in the terminal housing 11 cuts off motor 8 and fan 19 after a time delay as controlled by electrical circuit, not shown; this prevents carrier bounce back into the tube 13. Of course, and when the terminal housing 11 is under vacuum the door 30 is closed. But after the carrier 15 is received the door is opened by the terminal's user, or from a remote location, through an electrical circuit not shown, thereby exposing the carrier 15 to the terminal's user so that the carrier can be removed by the user. As the door 30 lowers or opens, contact of the door's nose with lower limit switch 85 stops door drive motor 89 through an electrical circuit not shown, thereby locating the door 30 in the open position. In this carrier 15 access attitude of the terminal housing 11, i.e., when the door 30 is open, gravity latch 96 swings downwardly into the solid line closure attitude shown in FIG. 2 which prevents the carrier from being prematurely pushed back into the system tube 13.

After the contents of the carrier 15 have been received from, and/or new contents inserted into, the carrier, the carrier is replaced back into the terminal housing 11. The configuration of the guide tray 14 insures that the carrier, as shown in FIGS. 2 and 3, will be co-axially located relative to access port 39 of the terminal housing 11. Once the carrier 15 has been repositioned within the terminal housing, the door 30 is closed by the terminal's user, or from a remote location, through an electrical circuit not shown. As the door 30 closes, i.e., as the door is lifted vertically upwardly by the door drive motor 89, the door's top edge 101 cams the system tube's gravity latch 96 out of the solid line latching position into the phantom line unlatching position to open up the system tube's access port 39 to the carrier 15. When the door 30 is fully closed, the upper limit switch 84 cuts off door drive motor 89, and an electrical ciruit is activated that either causes automatic or permits manual activation of the motor 8 and fan 19 by an electrical circuit not shown. In order that the terminal 10 can operate in the dispatch mode and through use of an electrical circuit not shown, the electro-mechanical actuator (not shown) also must translate the four-way valve 20 into the pressure mode so that the pusher housing 17 is pressurized with air along air flow path 196, 108, 111 through connector tube 49.

In the pressure or dispatch mode, the check valve flap 66 on the inside face 67 of the pusher flap's pusher wall 51 is pushed against that inside face, thereby closing vacuum ports 68 in that face. Further, 5 and due to the high pressure within the pusher housing 17 interior relative to the low pressure in the terminal housing 11 interior, the pusher flap 16 extends or swings outwardly (as illustrated by arrow 109 in FIG. 1) from a fully retracted attitude (shown in FIG. 5A) toward a fully extended or open attitude (shown in FIG. 5B). Because of the overlap of the pusher flap 16 with the end wall of the carrier 15, as shown in FIG. 4, in a first section 110 of that swinging path the carrier is pushed from the solid line position shown in FIG. 1 to the phantom line position shown in FIG. 1, the carrier thereby being preliminarily introduced or kicked back into the system tube 13. As the carrier 15 is being preliminarily pushed back into the pusher tube, the air tight integrity of the pusher housing 17 is maintained through the relative sealing relation of the pusher flap's side walls 52, 53 and bottom wall 54 with the pusher flap port 50 defined in the common end wall 28. However, after the carrier 15 has achieved preliminary insertion back into the system tub 13 as pushed or kicked by the pusher flap 16, pusher flap port 50 in the pusher housing 17 fully opens as the pusher flap 16 itself swings upwardly into its fully extended or open position against bumper 58 on the ceiling 25 of the terminal housing 11. This, of course, opens the terminal housing's interior to pneumatic pressure which, in turn, continues to push the carrier 15 into the system tube 13 and through the system tube, thereby dispatching the carrier from the terminal housing and aiding in transmitting the carrier to another terminal (not shown) remote from terminal 10.

Having described in detail the preferred embodiment of my invention, what I desire to claim and protect by Letters Patent is 1. A dispatch and receive terminal for a pneumatic carrier system of the type adapted to convey carriers from one location to another location, said terminal comprising a terminal housing strcutured to support a carrier at a rest position therein, said terminal housing also being structured to present a substantially air tight first plenum chamber when said terminal is in the dispatch mode, a system tube connected to said housing at a system tube port, a pusher movable between retracted and extended positions for pushing said carrier from said rest position at least partially into said tube when said terminal is in the dispatch mode, a pressure port defined in said terminal housing, said pressure port being closed by said pusher when said pusher is moved to said retracted position and being opened by said pusher when said pusher is moved to said extended position, and a pressure source connected to said pusher for selectively moving said pusher from said retracted to said extended position, said pressure port automatically connecting said pressure source to said system tube through said terminal housing when said pusher reaches said extended position to aid in dispatching said carrier through said system tube.

2. A dispatch and receive terminal as set forth in Claim 1, said pusher being of a generally scoop shaped configuration movable into and out of generally sealing relation with said pressure port, said pressure port being not opened in response to extension of said pusher until said carrier is pushed partially into said system tube.

3. A dispatch and receive terminal as set forth in Claim 2, said terminal further comprising a vacuum port defined in said pusher, said vacuum port being closed when said pusher is in the dispatch mode and said vacuum port being opened when said pusher is in the receive mode, a check valve connected with said vacuum port, said check valve closing said vacuum port when said terminal is in the dispatch mode and opening said vacuum port when said terminal is in the receive mode, and a vacuum source connected to said pusher for selectively opening said check valve when said pusher is in said retracted position, said vacuum port automatically connecting said vacuum source to said system tube through said terminal housing when said terminal is in said receive mode to aid in returning said carrier to said terminal housing.

4. A dispatch and receive terminal as set forth in claim 3, said check valve comprising a flap mounted on said pusher and sized to cover said vacuum port, said flap swinging open in response to exposure to said vacuum source, and swinging closed in response to exposure to said pressure source.

5. A dispatch and receive terminal as set forth in claim 3, said terminal further comprising a pusher housing structured to present a substantially air tight second plenum chamber when said pusher flap is in said retracted position, said pressure port connecting said terminal housing and said pusher housing.

6. A dispatch and receive terminal as set forth in claim 5, said terminal further comprising a door connected to said terminal housing, said terminal housing being substantially air tight when said door is closed, and the interior or said terminal housing being accessible to a terminal user when said door is open.

7. A dispatch and receive terminal as set forth in claim 6, said terminal further comprising a guide tray mounted in said terminal housing, said guide tray being positioned to locate said carrier in said terminal housing in a rest position at which said carrier's axis and said system tube port are substantially coaxial.

8. A dispatch and receive terminal as set forth in claim 2, said terminal further comprising a first bumper connected to said terminal for locating said pusher in said retracted position, and a second bumper connected to said terminal for locating said pusher in said extended position.

9. A dispatch and receive terminal as set forth in claim 2, said terminal further comprising return means connected to said terminal for returning said pusher to said retracted position when said pusher is not exposed to pressure.

10. A dispatch and receive terminal as set forth in claim 9, said pusher being swingably mounted on a generally horizontal axis, and said return means comprising a counter-weight mounted on said pusher, said counterweight causing said pusher to swing from said extended position back to said retracted position when said pusher is not exposed to said pressure source.

11. A dispatch and receive terminal as set forth in claim 1, said terminal further comprising a vacuum port connected with said pusher a check valve connected with said vacuum port, and a vacuum source selectively connectable to said vacuum port and check valve, said check valve being opened in response to vacuum and being closed in response to pressure, said vacuum port connecting said vacuum source to said system tube through said terminal housing automatically to aid in returning said carrier through said system tube into said terminal housing when said terminal is in said receive mode.

12. A dispatch and receive terminal as set forth in claim 11, said terminal further comprising a pneumatic circuit that includes said pressure and vacuum sources, said pneumatic circuit including a four-way valve that permits pressure and vacuum to be provided by the same source, the pressure and vacuum modes of said terminal being selectively obtained by the operational position of said four-way valve.

13. A dispatch and receive terminal for a pneumatic carrier system of the type adapted to convey carriers from one location to another, said terminal comprising a terminal housing structured to support a carrier at a rest position therein, a carrier access port defined in one end of said housing, said carrier access port being generally coaxially aligned with a carrier in said rest position, and a pusher flap swingable on an axis generally normal to the axis of a carrier in said rest position, said pusher flap being movable between a retracted position at which said carrier is located in said rest position and an extended position at which said carrier is at least partially pushed through said carrier access port out of said terminal housing, said pusher flap imparting a force on one end of said carrier generally parallel to said carrier's axis when said carrier is in said rest position for pushing said carrier at least partially through said carrier access port.

14. A dispatch and receive terminal as set forth in claim 13, said terminal being structured to present a substantial air tight first plenum chamber when said terminal is in the dispatch mode, and including a system tube connected to said carrier access port, a pressure port defined in said terminal housing, said pressure port being closed by said pusher when said pusher is moved to said retracted position and being opened by said pusher when said pusher is moved to said extended position, a pressure source connected to said pusher for selectively moving said pusher from said retracted to said extended position, said pressure port automatically connecting said pressure source to said system tube through said terminal housing when said pusher reaches said extended position to aid in dispatching said carrier through said system tube, and said pusher being of a generally scoop shaped configuration, said pusher being movable into and out of generally sealing relation with said pressure port, said pressure port not opening in response to movement of said pusher until said carrier has been pushed partially into said system tube.

15. A dispatch and receive terminal as set forth in claim 14, said terminal further comprising a vacuum port defined in said pusher, a check valve connected with said vacuum port, said check valve being structured to close in response to pressure on said pusher flap but being structured to open in response to a vacuum exposed to said pusher flap, and a vacuum source connected to said pusher for selectively opening said check valve, said vacuum port connecting said vacuum source to said system tube through said terminal housing to aid in returning said carrier through said system tube into said terminal housing.

16. A dispatch and receive terminal as set forth in claim 15, said terminal further comprising a pusher housing structured to present a substantially air tight second plenum chamber when said pusher is in the retracted attitude, said pressure port connecting said first and second plenum chamber.

17. A dispatch and receive terminal as set forth in claim 16, said terminal further comprising a door to said terminal housing, said terminal housing being substantially air tight when said door is closed, and a carrier within said terminal housing being accessible to a terminal user when said door is open.

18. A dispatch and receive terminal as set forth in claim 15, said check valve comprising a flap connected to the pusher and overlying said vacuum port, said flap being pushed against the face of said pusher to close said vacuum port when said terminal is in the pressure mode, and said flap being swung away from said vacuum port to open said port when said terminal is in the vacuum mode.

19. A dispatch and receive terminal as set forth in claim 15, said terminal further comprising a pneumatic circuit that includes said pressure and vacuum sources, said circuit comprising a four-way valve selectively positionable to present pressure or vacuum to said terminal.

20. A dispatch and receive terminal as set forth in claim 14, said terminal further comprising a first bumper connected to said terminal, said first bumper locating said pusher in said retracted position, and a second bumper connected to said terminal, said pusher abutting said second bumper in said fully extended position.

21. A dispatch and receive terminal as set forth in claim 14, said terminal further comprising a return means connected to said pusher for returning said pusher to said retracted position when said pusher is not exposed to pressure.

22. A method of dispatching a carrier from a dispatch and receive terminal for a pneumatic carrier system, said method comprising the steps of positioning a carrier at a rest position in generally coaxial orientation with a system tube connected to a terminal housing, moving a pusher from a retracted position to an extended position for pushing the carrier from the rest position at least partially into the tube, said pusher being so moved in response to pneumatic pressure from a pressure source, and opening a pressure port defined in the terminal housing by movement of said retracted position to said extended position when said pusher achieves said extended postion, said pressure port automatically connecting the pressure source to the system tube through said terminal housing when said terminal is in the dispatch mode to aid in dispatching the carrier through said system tube.

23. A method as set forth in claim 22, including the step of selectively connecting a vacuum source to said pusher for opening a vacuum port in said pusher when said pusher is in the retracted position, said vacuum port automatically connecting the vacuum source to the system tube through said terminal housing when the terminal is in the receive mode to aid in returning the carrier from said system tube to said terminal housing.

24. A method as set forth in claim 22 including the steps of moving said pusher from said extended position to said retracted position for preparing the terminal to receive a carrier at said rest position, and connecting a vacuum source to said system tube through a vacuum port defined in the terminal when the terminal is in the receive mode and when said pusher is in said retracted position to aid in returning the carrier from said system tube to said terminal housing.

25. A method as set forth in claim 24 including the steps of defining said vacuum port in said pusher, and p1 connecting a check valve with said vacuum port, said check valve preventing connection of said pressure source with said terminal housing through said vacuum port in the dispatch mode but permitting connection of said vacuum source with said terminal housing through said vacuum port in the receive mode.

26. A method as set forth in claim 22 including the step of
moving said pusher into and out of generally sealing relation with said pressure port upon moving said pusher between said retracted and extended positions.

* * * * *

UNITED STATES PATENT AND TRADEMARK OFFICE
CERTIFICATE OF CORRECTION

PATENT NO. : 4,189,260

DATED : February 19, 1980

INVENTOR(S) : Robert Morano, Adam Weismuller & Victor Vogel

It is certified that error appears in the above-identified patent and that said Letters Patent are hereby corrected as shown below:

Column 9 line 15 change "strcutured" to --structured--

Column 10 line 12 change "or" to --of--

Column 12 line 39 after "said" add --pusher from said--

Column 12 line 68 delete "pl"

Signed and Sealed this

First Day of July 1980

[SEAL]

Attest:

SIDNEY A. DIAMOND

Attesting Officer

Commissioner of Patents and Trademarks